(12) United States Patent
Ardo et al.

(10) Patent No.: US 10,469,759 B2
(45) Date of Patent: Nov. 5, 2019

(54) COMBINING OPTICAL AND DIGITAL ZOOM UNDER VARYING IMAGE CAPTURING CONDITIONS

(71) Applicant: Axis AB, Lund (SE)

(72) Inventors: Bjorn Benjamin Ardo, Lund (SE); Johan David Philip Nystrom, Vellinge (SE)

(73) Assignee: AXIS AB, Lund (SE)

(*) Notice: Subject to any disclaimer, the term of this patent is extended or adjusted under 35 U.S.C. 154(b) by 70 days.

(21) Appl. No.: 15/805,391

(22) Filed: Nov. 7, 2017

(65) Prior Publication Data
US 2019/0141251 A1    May 9, 2019

(51) Int. Cl.
*H04N 5/232* (2006.01)
*H04N 5/235* (2006.01)
*H04N 5/238* (2006.01)

(52) U.S. Cl.
CPC ......... *H04N 5/23296* (2013.01); *H04N 5/238* (2013.01); *H04N 5/2353* (2013.01); *H04N 5/23216* (2013.01)

(58) Field of Classification Search
CPC ........... H04N 5/23296; H04N 5/23216; H04N 5/2353; H04N 5/238
See application file for complete search history.

(56) References Cited

U.S. PATENT DOCUMENTS

| | | |
|---|---|---|
| 5,119,122 A | 6/1992 | Kudo et al. |
| 5,867,217 A | 2/1999 | Okino et al. |
| 7,417,673 B2 | 8/2008 | Wright et al. |
| 2002/0154912 A1 | 10/2002 | Koseki et al. |
| 2006/0269265 A1* | 11/2006 | Wright ............ H04N 5/232 396/60 |
| 2009/0268060 A1* | 10/2009 | Georgis ............ H04N 5/232 348/240.1 |

(Continued)

FOREIGN PATENT DOCUMENTS

| | | |
|---|---|---|
| EP | 2112822 A2 | 10/2009 |
| JP | H0398036 A | 4/1991 |
| JP | 2007067827 A | 3/2007 |

(Continued)

OTHER PUBLICATIONS

Partial European Search Report issued in corresponding European Application No. 18150122.2, dated Jul. 18, 2018, 11 pages.

(Continued)

*Primary Examiner* — Nicholas G Giles
(74) *Attorney, Agent, or Firm* — Snyder, Clark, Lesch & Chung, LLP

(57) ABSTRACT

A device includes a lens assembly to focus an image or to optically zoom, a sensor array to capture an image; a memory to store instructions; and a processor to execute the instructions. The processor may execute the instructions to: cause the sensor array to capture an image; determining a field of view in the captured image; obtain parameter values based on sensor measurements associated with the captured image; obtain a digital zoom profile and an optical zoom profile based on the parameter values, the captured image, and the field of view; and jointly apply the digital zoom profile and the optical zoom profile to set the camera to the received zoom request for the field of view.

20 Claims, 6 Drawing Sheets

(56) References Cited

U.S. PATENT DOCUMENTS

2011/0216222 A1 9/2011 Niyagawa et al.
2012/0038796 A1* 2/2012 Posa .................. H04N 5/23296
348/240.2

FOREIGN PATENT DOCUMENTS

JP        2011029719 A    2/2011
JP        2012095082 A    5/2012

OTHER PUBLICATIONS

Extended European Search Report issued in corresponding European Application No. 18150122.2, dated Nov. 2, 2018, 12 pages.

* cited by examiner

COMBINING OPTICAL AND DIGITAL ZOOM UNDER VARYING IMAGE CAPTURING CONDITIONS

BACKGROUND

Cameras and other monitoring devices have become less expensive over the years. As a result, their use has become more wide spread. As cameras and monitoring devices proliferate, manufacturers are designing and incorporating many features into such devices, to aid users to capture high-quality images.

SUMMARY

According to one aspect, a method may include: capturing an image at a sensor array of a camera; determining a field of view; obtaining a parameter value associated with the captured image; obtaining a digital zoom profile, indicative of digital magnification, and an optical zoom profile, indicative of optical magnification, based on the parameter value and the field of view; and jointly applying the digital zoom profile and the optical zoom profile to the image captured at the sensor array for the determined field of view.

Additionally, the parameter value may include a light intensity measurement value, and the optical magnification may be prioritized over the digital magnification based on the light intensity measurement value.

Additionally, the parameter value may include a depth of field value, and the digital magnification may be prioritized over the optical magnification based on the depth of field value.

Additionally, the parameter value may include a sensor resolution and a resolution for display, and the digital zoom profile may be based on the sensor resolution and the resolution for display.

Additionally, the parameter value may include an area defined as including motion, and the digital magnification may be prioritized over the optical magnification when the field of view is within the area defined as including motion.

Additionally, the area defined as including motion may be associated with a time period.

Additionally, the method may further include adjusting an exposure of light associated with the field of view.

Additionally, adjusting an exposure of light associated with the field of view may include changing a shutter speed or an aperture.

Additionally, the method may further include receiving user input to reset the digital magnification and the optical magnification prior to applying the digital zoom profile and the optical zoom profile.

Additionally, jointly applying the digital zoom profile and the optical zoom profile may include changing an orientation of the camera.

According to another aspect, a device may include: a lens assembly to focus an image or to optically zoom; a sensor array to capture an image output from the lens assembly; a memory to store instructions; and a processor to execute the instructions. The processor may execute the instructions to: cause the sensor array to capture an image; determine a field of view; obtain a parameter value associated with the captured image; obtain a digital zoom profile, indicative of digital magnification, and an optical zoom profile, indicative of optical magnification, based on the parameter value and the field of view; and jointly apply the digital zoom profile and the optical zoom profile to the captured image for the determined field of view.

Additionally, the parameter value may include a light intensity measurement value, and the processor may execute the instructions to prioritize the optical magnification over the digital magnification based on the light intensity measurement value.

Additionally, the parameter value may include a depth of field measurement value, and the processor may execute the instructions to prioritize the digital magnification over the optical magnification based on the depth of field measurement value.

Additionally, the parameter value may include a sensor resolution and a resolution for display, and the digital zoom profile may be based on the sensor resolution and the resolution for display.

Additionally, the parameter value may include an area defined as including motion, and the processor may execute the instructions to prioritize digital magnification over the optical magnification when the field of view is within the area defined as including motion.

Additionally, the area defined as including motion may be associated with a time period.

Additionally, the processor may further execute the instructions to adjust an exposure of light associated with the field of view.

Additionally, when the processor adjusts an exposure of light associated with the field of view, the processor may further execute the instructions to change a shutter speed or an aperture.

Additionally, the processor may further execute the instructions to receive user input to reset the digital magnification and the optical magnification prior to applying the digital zoom profile and the optical zoom profile.

Additionally, when the processor jointly applies the digital zoom profile and the optical zoom profile, the processor may further execute the instructions to change an orientation of the lens assembly.

DETAILED DESCRIPTION OF EMBODIMENTS

Figure 1:
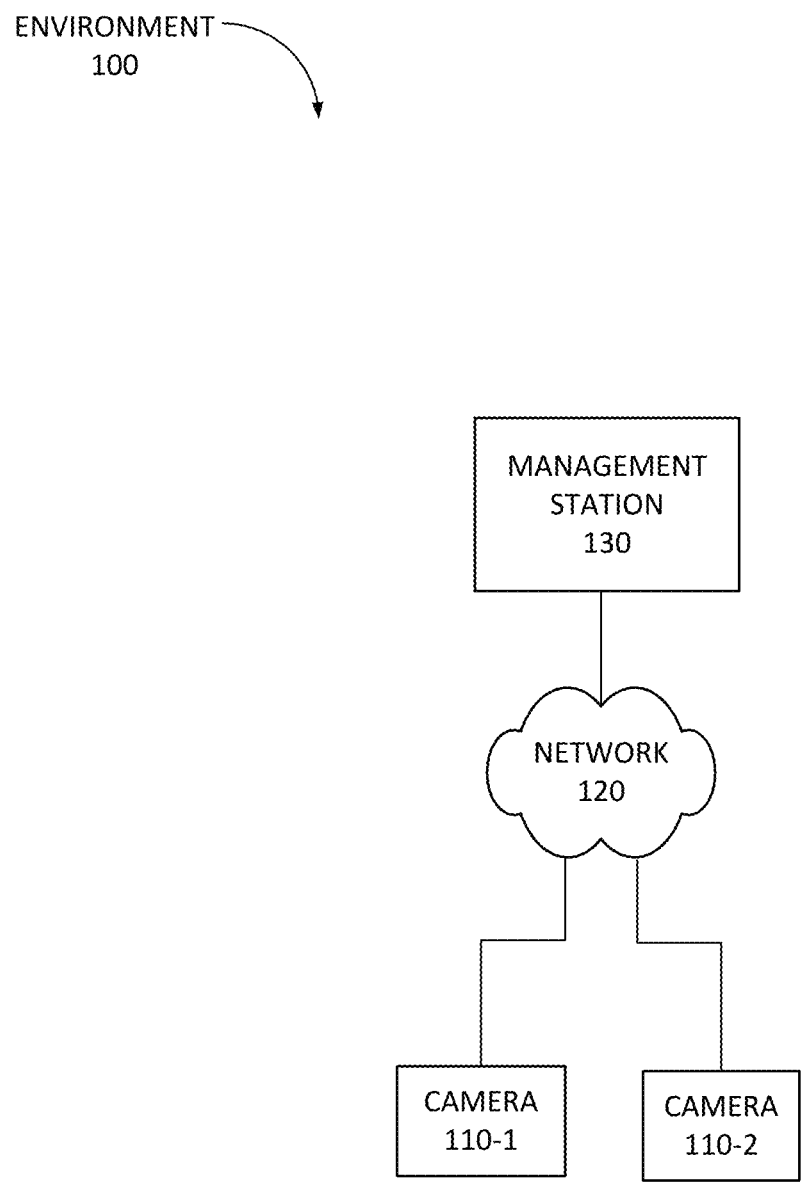
FIG. 1 illustrates an exemplary environment in which embodiments described herein may be implemented.

The following detailed description refers to the accompanying drawings. The same reference numbers in different drawings may identify the same or similar elements.

The term "image," as used herein, refers to an analog or digital representation of visual information (e.g., a picture, a video, a photograph, an animation, etc.). The term "image" may also be used to mean "image sensor data" or any data describing an image.

The term "camera," as used herein, includes a device that captures and stores images. For example, a digital camera may include an electronic device that captures and stores images electronically instead of using photographic film. A digital camera may be multifunctional, with some devices capable of recording sound and/or images.

A "subject," as the term is used herein, is to be broadly interpreted to include any person, place, and/or thing capable of being captured as an image. As used herein, the term "light" may not only refer to visible light, but also light (e.g., electromagnetic radiation) in non-visible spectra.

Modern digital cameras can apply both a digital zoom and an optical zoom. In particular, a camera that has a higher resolution image sensor than the output resolution for display can apply digital zoom without losing optical resolution. One way of combining digital zoom and optical zoom is to first zoom optically (e.g., increase optical magnification until maximum optical magnification has been reached) and then to zoom digitally (e.g., increase digital magnification). The transition between the two types of zoom, however, can be noticeable and jarring to the user in some circumstances. As the term is used herein, to "zoom" means to change (e.g., increase or decrease) the optical magnification, and/or change the digital magnification, and/or change the total magnification of an image. To "zoom in" means to increase the magnification, optically and/or digitally, of an image. To "zoom out" means to decrease the magnification, optically and/or digitally, of an image.

In one embodiment described below, a camera provides a simultaneous digital and optical zoom (e.g., not exhausting the ability to increase magnification from one type of zoom before applying the other). By providing both digital and optical zoom jointly, the camera may avoid the abrupt transition from optical zoom to digital zoom. Providing digital and optical zoom jointly can make zooming faster, particularly compared to using optical zoom alone. Providing digital and optical zoom jointly can also maintain a longer depth of field, compared to just using optical zoom, which can make automatic focus easier for the camera. Further, in one embodiment, providing both digital zoom and optical zoom jointly, the camera may also avoid the abrupt transition from a digital zoom to an optical zoom (e.g., when additional digital zooming would otherwise degrade the image quality). The simultaneous digital and optical zoom can be referred to as "interleaving" digital and optical zoom or applying digital and optical zoom "jointly."

Depending on different image capturing conditions, the camera uses different ratios of digital to optical zooms. For example, under a poor lighting condition, the camera may prioritize an optical zoom to utilize the entirety of the image sensor and maintain higher light sensitivity. Under good lighting conditions, on the other hand, the camera may prioritize a digital zoom and/or magnification over optical zoom. In another example, when the depth of field is shallow, contrast-based autofocus may become more difficult. In this case, the camera may prioritize a digital zoom and/or magnification to maintain a larger depth of field. The depth of field may be a factor of aperture size and the magnification level of optical zoom, for example.

In one embodiment, a camera has a variable aperture lens that decreases the aperture when increasing an optical zoom to reduce the amount of light passing through the periphery of the camera's lens. In other words, this type of variable aperture lens reduces the aperture size upon increased optical zoom to limit the incident light to the center of the camera lens to maintain image quality (e.g., the center of the lens may have fewer imperfections than the edge of the lens). Accordingly, in one embodiment when using this type of variable aperture camera, in instances where it may be undesirable to reduce the aperture size, the camera may prioritize digital zoom and/or magnification over optical zoom and/or magnification.

FIG. 1 illustrates an exemplary environment 100 in which embodiments described herein may be implemented. As shown, environment 100 may include cameras 110-1 and 110-2 (collectively referred to as cameras 110 and individually as camera 110), network 120, and management station 130.

Camera 110 may include, for example, a video camera that captures image data using visible light, infrared light, and/or other non-visible electromagnetic radiation (e.g., a radar for radar imaging). The captured image data may include a continuous image sequence (e.g., video), a limited image sequence, still images, and/or a combination thereof. Camera 110 may include a digital camera for capturing and digitizing images.

Network 120 may enable devices in environment 100 to communicate with each other. For example, cameras 110 may communicate with each other and management station 130. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, a wireless mesh network, an intranet, the Internet, a fiber optic-based network, a wireless network, and/or a combination of these or other types of networks.

Management station 130 may include any computing device configured for communicating with camera 110. For example, management station 130 may include a personal computer or a workstation (e.g., with a monitor, keyboard, mouse, etc.), a server device, a laptop, a tablet computer, a portable communication device (e.g., a mobile phone, a smart phone, and/or another type of wireless device), a server device, and/or any type of device with computational and communication capability.

Cameras 110 send data to management station 130 through network 120. For example, cameras 110 may stream images or video to management station 130 for a person to view on a display. Management station 130 may also send data through network 120 to cameras 110.

Although FIG. 1 shows exemplary components of environment 100, in other implementations, environment 100 may include fewer components, different components, differently arranged components, or additional components than depicted in FIG. 1. For example, environment 100 may include many cameras 110. Additionally or alternatively, any one device (or any group of devices) may perform functions described as performed by one or more other devices.

Figure 2:
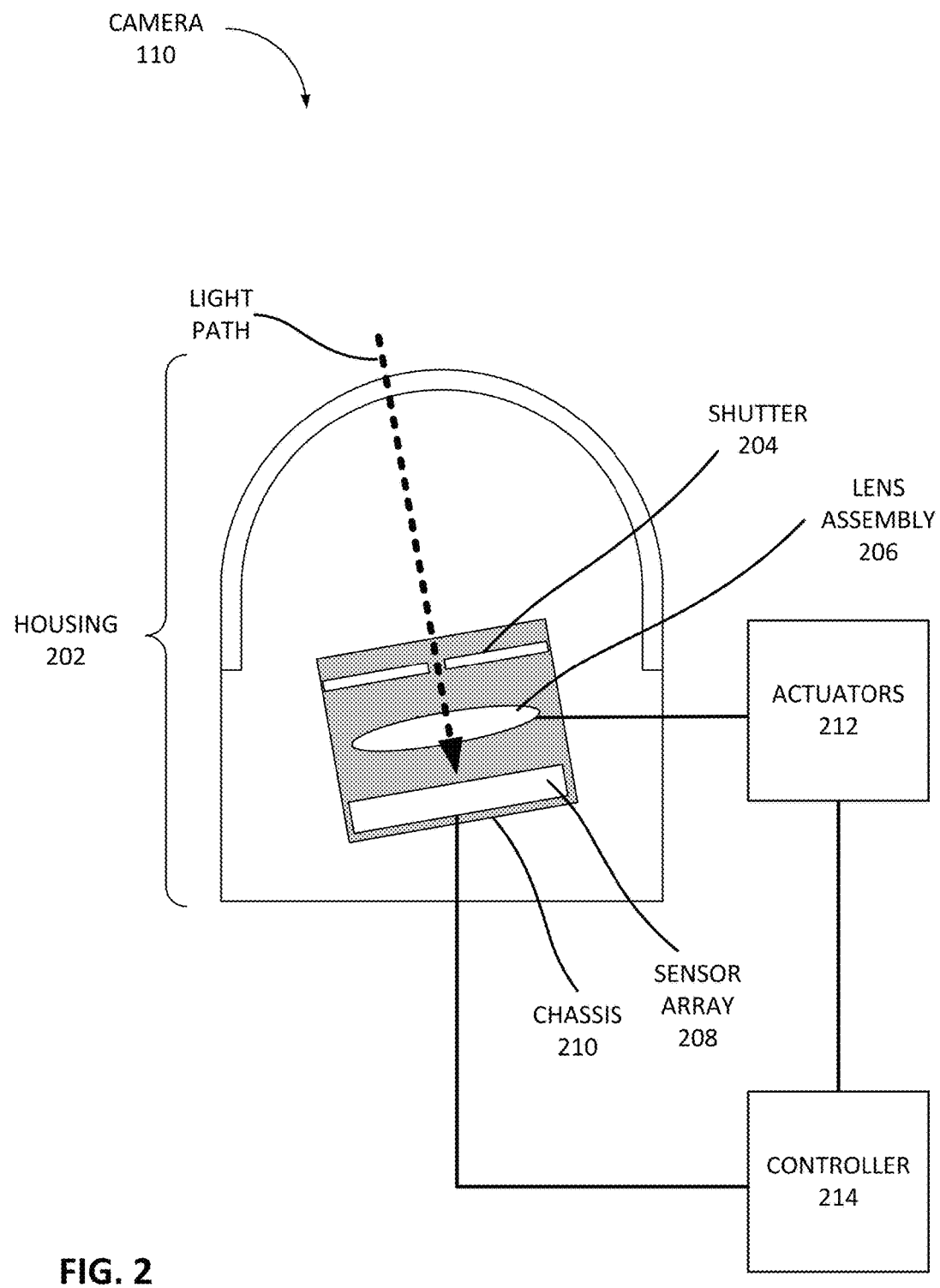
FIG. 2 is a diagram illustrating exemplary components of the camera of FIG. 1 in one embodiment.

FIG. 2 is a diagram illustrating exemplary components of camera 110 in one embodiment. In other embodiments, camera 110 may be implemented as a radar or a sonar, for example. As shown in FIG. 2, camera 110 may include a housing 202, shutter 204, lens assembly 206, sensor array 208, chassis 210, actuators 212, and controller 214.

Housing 202 may protect components of camera 110 from external elements. As shown, housing 202 contains shutter 204, lens assembly 206, sensor array 208, and chassis 210. Although not illustrated, housing 202 may contain additional components, depending on the implementation. For example, in one implementation, housing 202 may include actuators 212 and controller 214.

Shutter 204 provides an opening for light to reach lens assembly 206 and/or other internal optical components of camera 110. Depending on the embodiment, shutter 204 may include optical stops (e.g., shutter) or another type of optical component (e.g., neutral density filter). In one embodiment, shutter 204 may adjust the size of the its opening or the duration of shutter opening to control the amount of light that reaches sensor array 208 and is captured by sensor array 208. Although shutter 204 is illustrated as being positioned in front of lens assembly 206, in one implementation, each component of shutter 204 may be located at any point, on a light path, suitable for adjusting the amount of light that reaches sensor array 208.

Lens assembly 206 may include a device for manipulating light from a given or a selected direction and/or range, so that images in the direction and/or range can be captured in a desired manner. Lens assembly 206 may include different types of lenses (e.g., convex, concave, reflective, etc.). In one embodiment, lens assembly 206 may include a set of magnification lenses for performing an optical zoom. Light passing through shutter 204 and lens assembly 206 may be optically magnified by lens assembly 206.

Sensor array 208 may include an array of sensors for registering, sensing, and measuring light incident or falling onto sensor array 208. The light may be in the visible spectrum, the infrared spectrum, or other wavelength ranges. Sensor array 208 may include, for example, a charged coupled device (CCD) array and/or an active pixel array (e.g., a complementary metal-oxide-semiconductor (CMOS) sensor array).

Sensor array 208 outputs data that is indicative of (e.g., describes properties or characteristics) the light incident on sensor array 208. For example, the data output from sensor array 208 may include information such as the intensity of light (e.g., luminance), color, etc., incident on one or more pixels in sensor array 208. The light incident on sensor array 208 may be an image formed from light focused by lens assembly 206. Sensor array 208 may provide picture elements, or "pixels." As used herein, a "pixel" may mean any region or area of sensor array 208 for which measurement(s) of light are taken (e.g., measurements that are indicative of the light incident on sensor array 208). A pixel may correspond to one or more (or less than one) sensor(s) in sensor array 208. A pixel for sensor array 208 may be different from a pixel of a display.

Chassis 210 provides a structure for mounting different optical components, such as shutter 204, lens assembly 206, and/or sensor array 208. When chassis 210 changes its position (i.e., coordinates or orientation), all components mounted on chassis 210 may also change their positions and orientations, about the center of chassis axis.

Actuators 212 may include electromechanical components (e.g., servomotors) for modifying a physical configuration of components of camera 110 based on input from controller 214. In one embodiment, actuators 212 may change, for example, the magnification of lens assembly 206, modify the location of image plane of lens assembly 206 by repositioning one or more of the lenses, and/or change the size of the opening of shutter 204 to admit more or less light. In another example, based on input from controller 214, actuators 212 may change a direction of chassis 210 and thus the direction of lens assembly 206.

Controller 214 controls the operation of camera 110. For example, controller 214 may control the operation of sensor array 208 and actuators 212 based on input from other sensors (not shown), sensor array 208, etc. For example, controller 214 may send control signals to actuators 212 to change the direction of lens assembly 206, the size of the opening of shutter 204, etc.

Controller 214 may also provide for other functions of camera 110, such as presenting a graphical user interface (GUI) to a user, applying digital signal processing (e.g., noise reduction), applying a digital zoom, retrieving or storing images, running an application, communicating with other devices over a network (e.g., uploading images to a cloud, sending/receiving text messages or an email, etc.), etc. As noted above, light passing through lens assembly 206 may be optically magnified before the light impinges on sensor array 208. In one embodiment, controller 214 may perform digital magnification to the image as received by sensor array 208.

The components shown in FIG. 2 are exemplary. In other implementations, camera 110 may include fewer components, different components, differently arranged components, or additional components than depicted in FIG. 2. For example, camera 110 may include additional sensors and/or detectors and optical components (e.g., filters). Additionally or alternatively, one or more components of camera 110 may perform functions described as performed by one or more other components of camera 110.

Figure 3:
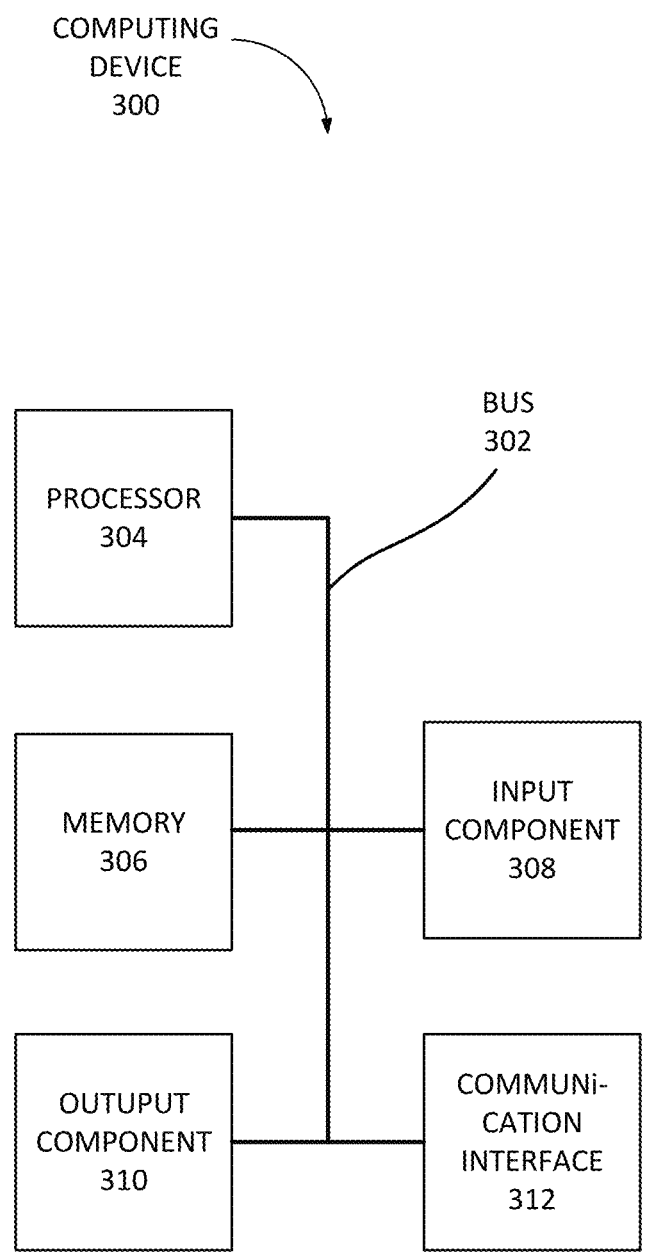
FIG. 3 is a block diagram of exemplary components of a computing device in one embodiment.

FIG. 3 is a block diagram illustrating exemplary components of a computing device 300 in one embodiment. Controller 214 in camera 110 and management station 130 may each include a computing device 300. As shown in FIG. 3, computing device 300 may include a bus 302, a processor 304, a memory 306, a storage device 308, an input component 308, an output component 310, and a communication interface 312.

Bus 302 includes a path that enables communication among the components of computing device 300. Processor 304 may include any type of single-core processor, multi-core processor, microprocessor, latch-based processor, and/or processing logic (or families of processors, microprocessors, and/or processing logics) that interprets and executes instructions. In other embodiments, processor 304 may include an application-specific integrated circuit (ASIC), field-programmable gate array (FPGA), and/or another type of integrated circuit or processing logic. Processor 304 may include a hardware accelerator, such as a graphical processing unit (GPU). In some embodiments the hardware accelerator may include an ASIC, an FPGA, another type of integrated circuit, one or more specialized integrated circuits (e.g., with hardwired digital and/or analog circuits), etc. The hardware accelerator may be implemented on a different chip than processor 304 or as a part of processor 304.

Memory 306 may include any type of volatile and/or non-volatile storage device that stores information and/or instructions. Memory 306 may include a random access memory (RAM) or any type of dynamic storage device, a read-only memory (ROM) device or any type of static storage device.

Memory 306 may also or alternatively include a magnetic and/or optical storage/recording medium. In some embodiments, some or all of memory 306 may be mounted under a directory tree or may be mapped to a drive. The term "medium," "memory," "storage," "storage device," "storage medium," and/or "storage unit" may be used herein interchangeably. For example, a "computer-readable storage device" or "computer readable storage medium" may refer to a memory and/or storage device.

Input component 308 may enable a user to input information to computing device 300. Input component 308 may include, for example, a microphone, a touch screen, voice recognition and/or biometric mechanisms, infrared sensors, touch-screen sensors, acoustic sensors, etc. Output component 310 may output information to the user. Output component 310 may include, for example, a display, a speaker, etc.

Communication interface 312 may include a transmitter and/or receiver (e.g., transceiver) that enables computing device 300 to communicate with other components, devices, and/or systems. Communication interface 312 may communicate via wireless communications (e.g., radio frequency, infrared, etc.), wired communications, or a combination thereof. Communication interface 312 may include a transceiver that converts baseband signals to radio frequency (RF) signals or vice versa and may be coupled to an antenna.

Communication interface 312 may include a logical component that includes input and/or output ports, input and/or output systems, and/or other input and output components that facilitate the transmission of data to other devices. For example, communication interface 312 may include a network interface card (e.g., Ethernet card) for wired communications or a wireless network interface (e.g., a WiFi) card for wireless communications.

Computing device 300 may perform the operations described herein in response to processor 304 executing software instructions stored in a non-transient computer-readable medium, such as memory 306. The software instructions may be read into memory 306 from another computer-readable medium or from another device via communication interface 312. The software instructions stored in memory 306, when executed by processor 304, may cause processor 302 to perform processes that are described herein. For example, as a camera 110, programs (which are shown as functional components in FIG. 4) run by computing module 300 may direct camera 110 to perform a concurrent digital and optical zoom.

Computing device 300 may include other components (not shown) that aid in receiving, transmitting, and/or processing data. Moreover, other configurations of components in computing device 300 are possible. In other implementations, computing device 300 may include fewer components, different components, additional components, or differently arranged components than depicted in FIG. 3. Additionally or alternatively, one or more components of computing device 300 may perform one or more tasks described as being performed by one or more other components of computing device 300.

Figure 4:
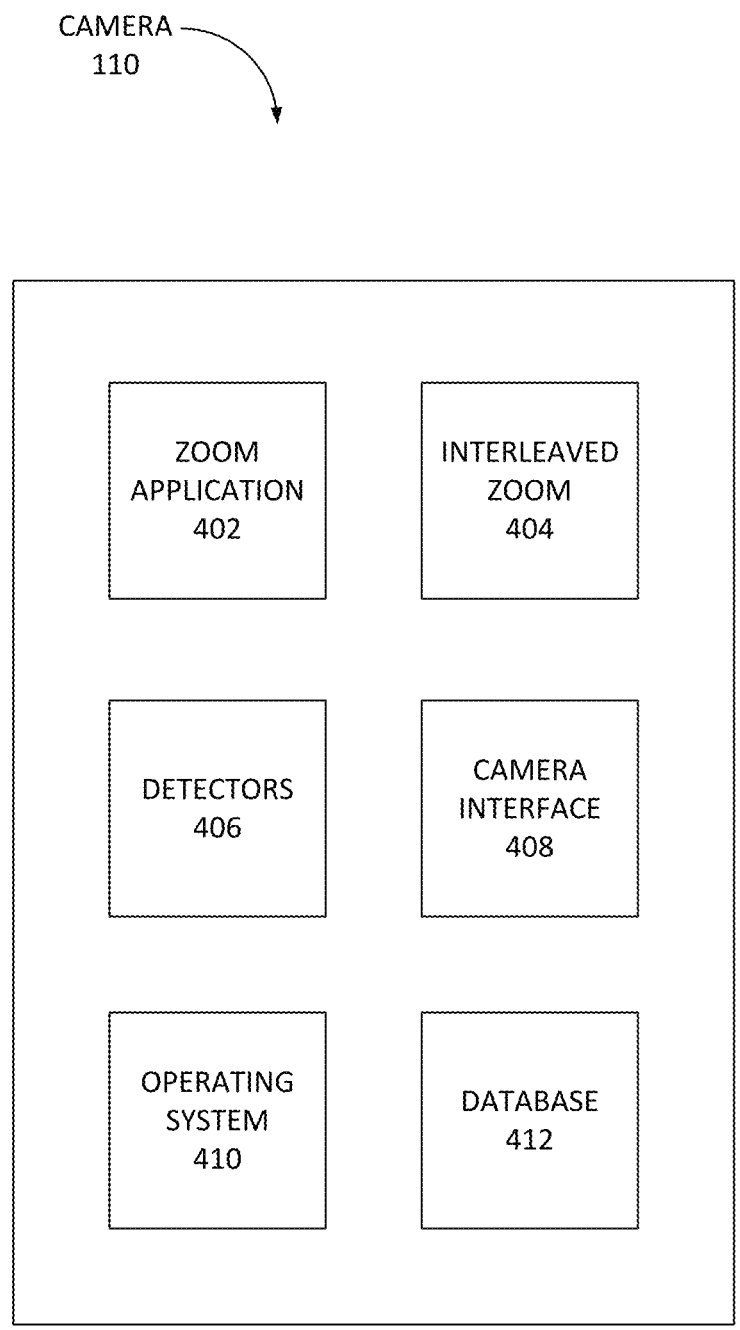
FIG. 4 is a block diagram illustrating exemplary functional components of the camera of FIG. 1.

FIG. 4 is a block diagram illustrating exemplary functional components of camera 110. As shown, camera 110 may include a zoom application 402, an interleaved zoom application 404, detectors 406, a camera interface 408, an operating system 410, and a database 412. Although components 402-412 are implemented as software in the example of FIG. 4, in other embodiments, components 402-412 may be implemented as hardware or a combination of hardware and software.

Operating system 410 may include software instructions for managing hardware and software resources of camera 110. For example, operating system 410 may include Linux, Windows, OS X, Android, an embedded operating system, etc. Operating system 410 may also provide certain network services, device drivers, file management system, memory management, multiprocessing capabilities, etc.

Database 412 may store images, user preferences, settings, OS configurations, camera configurations, etc. In a different embodiment, database 412 may store information that is needed for camera 110 to boot up in a desired state. Other information (e.g., images, videos, audios, etc.) may be stored in a cloud and/or a network, and may be downloaded to camera 110 on demand.

Zoom application 402 may receive an input request that specifies a desired magnification and/or zoom. Zoom application 402 may obtain camera information or measurement values via detectors 406 and/or camera interface 408, determine a digital magnification and/or an optical magnification, and apply the determined digital and/or the optical magnification by instructing camera 110, through camera interface 408, to zoom in or out digitally and/or optically.

In some configurations, when zoom application 402 receives a request to zoom (e.g., to change magnification), zoom application 402 may jointly apply a digital zoom and an optical zoom. The joint application of digital and optical zooms means the total magnification, which is the combined optical magnification and the digital magnification, may be reached or obtained (e.g., zooming) through an incremental application of each type of magnification, where the increments (e.g., change in magnification) may depend on the situation. For example, each zoom may be applied in an interleaved manner to reduce artifacts which may be perceived by the operator. The application of each type of zoom may be determined based on profiles which may be mathematically described or defined discretely through lookup tables. For example, a profile for changing the optical magnification from 1.0 to 2.0 may be a linear function of the total magnification. A profile for changing the optical magnification and a profile for changing the digital magnification may be implemented jointly (e.g., simultaneously or in an interleaved manner) in such a way to appear continuously and smooth to a user.

The joint application of digital and optical zoom may also mean that one type of zoom/magnification does not necessarily have to be exhausted before applying the other type of zoom/magnification. For example, in one configuration, camera 110 may digitally zoom even though additional optical zoom (optical magnification) is available to it. Such concurrent optical and digital zoom may allow camera 110 to smoothly zoom in on an image and focus on the image, as its overall zoom is increased. In a different configuration, camera 110 may exclusively zoom optically if optical zoom alone can achieve the requested magnification. As noted above, however, as camera 110 zooms, the transition from an optical zoom (e.g., once optical magnification is exhausted) to a digital zoom (e.g., to supplement optical magnification) may result in a visible, undesirable display artifact (i.e., discontinuity), and may hinder optimizing the capturing of high quality images. Further, as camera 110 optically zooms to an object farther away, the depth-of-field (DOF) decreases, which can make automatic focusing more difficult under some circumstances. In another configuration, even though camera 110 may jointly apply digital and optical zoom, camera 110 may nonetheless apply optical zoom after having exhausted digital zoom. In this situation, visible, undesirable display artifacts may still occur.

In one embodiment, zoom application 402 may receive the magnification request over a network. Additionally or alternatively, zoom application 402 may receive the request via one or more input components 310. Depending on the embodiment, the request may be from another device, a program, an internal component of camera 110, and/or a user.

In one implementation, zoom application 402 includes a desired field of view for zoom and/or selectable zoom modes. Upon receipt of a request for a particular magnification, zoom application 402 may determine an optical magnification value $Z_o$ (or simply "optical magnification $Z_o$") and/or a digital magnification value $Z_d$ (or simply "digital magnification $Z_d$") for zooming. Zoom application 402 may instruct camera 110 to zoom to the digital and/or optical magnification values $Z_d$ and $Z_o$ through camera interface 408.

Figure 5:
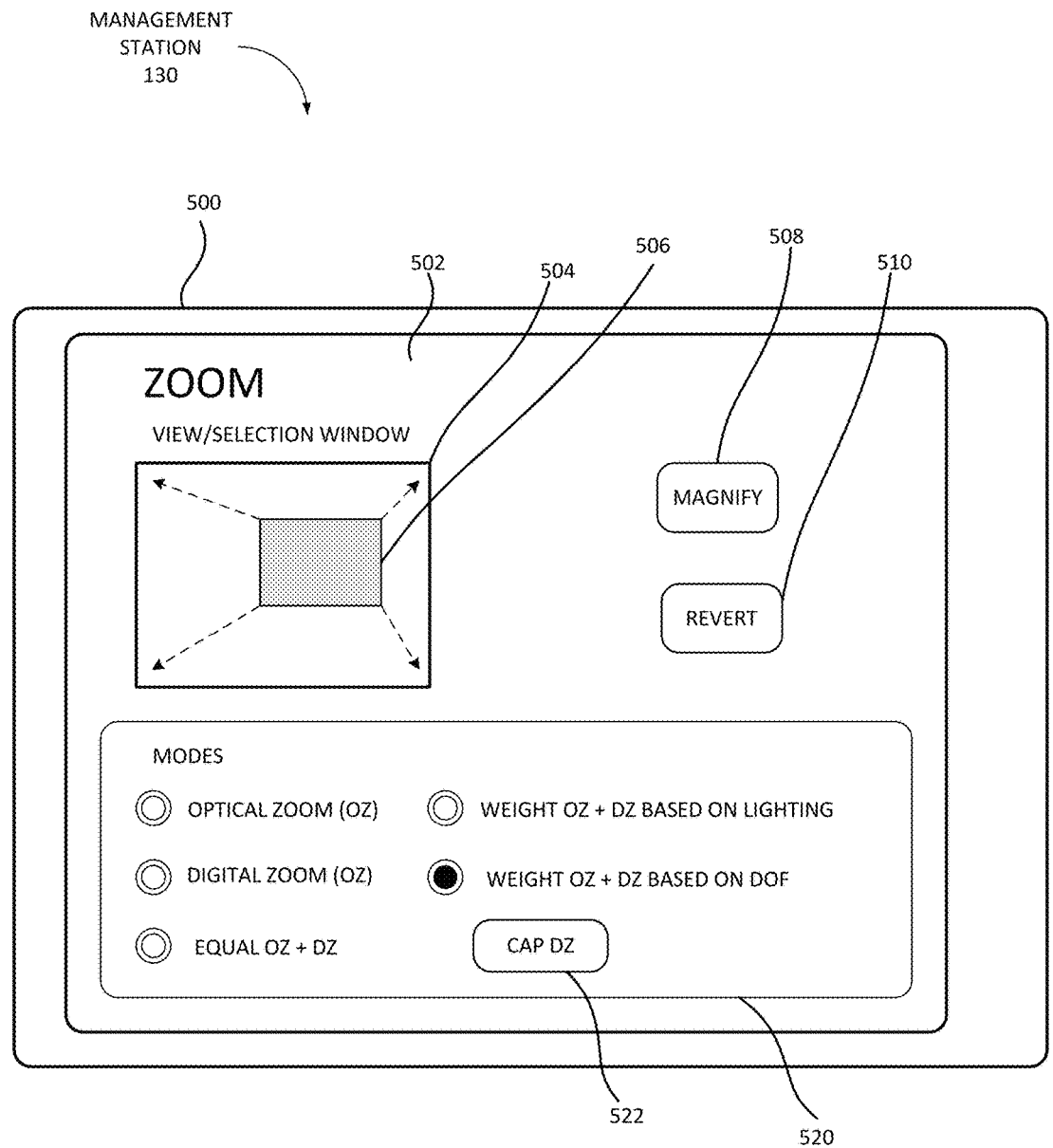
FIG. 5 illustrates an exemplary user interface for applying a zoom and for selecting different digital and optical zoom options.

FIG. 5 illustrates an exemplary display 500 showing a user interface 502 for application 402. Management device 130 may include display 500 and user interface 502 may provide components for an operator to perform zoom-related functions that are associated with camera 110. As shown, user interface 502 may include a display window 504 (e.g., a viewfinder) to show the field of view of camera 110. User interface 502 also shows a current field of view and different zoom modes.

In the embodiment illustrated in FIG. 5, a desired zoom area 506 (e.g., a field of view to zoom into) within display window 504 may be indicated automatically or through different input mechanisms. For example, camera 110 may automatically zoom into a zoom area 506 if camera 110 is following an object, or set to observe a particular area at a particular time or in response to an event. Alternatively, the operator could select zoom area 506 using a mouse, touch screen (e.g., two fingers), a mouse wheel, a graphical widget (e.g., arrow, a scroll arrow, etc.). In a different embodiment, a desired zoom area may be implied. For instance, a particular key (e.g., control key) may be pressed as a mouse wheel is rotated to zoom. In such an embodiment, each incremental turn of the mouse wheel may specify a particular level of magnification. As the mouse wheel turns, the zoom area may expand to fill display window 504.

In the example of FIG. 5, after desired zoom area 506 is determined, application 402 may be requested to zoom. In one example, the request may be automatic. In another example, the request may be made by activating a magnify button 508 (e.g., a GUI component). Upon receipt of the request, application 402 may zoom to the desired zoom area 506, which causes the zoom area 506 to expand and fully occupy display window 504 (as shown with dotted lines). Depending on the implementation, when executing the zoom (e.g., the optical zoom), application 402 may re-orient camera 110 so that when zoom area 506 has expanded to fill display window 504, the center of desired field of view becomes the center of display window 504.

As shown in FIG. 5, user interface 502 may also include a revert button 510. Revert button 510 may be activated when a resulting zoom is to be discarded and application 402 is to revert back to the prior view. To implement this feature, application 402 may store the current settings (e.g., focus, aperture size, direction, etc.). The saved settings then may be used to restore the camera state prior to the zoom.

In some embodiments, camera 110 may be installed near a location with many moving objects (e.g., a street with cars). For such situations, camera 110 may specify and store one or more areas of motion. The area of motion may define an area that includes moving objects (e.g., cars). The area of motion may be determined through sensors (e.g., learned by detecting moving objects in the area) or may be input by a user. When a field of view is within the area of motion, autofocus may become more difficult. In one embodiment, when application 402 zooms into a field of view within the area of motion (or zooms into a field of view in which the area of motion would interfere with autofocus), application 402 may prioritize digital zoom and/or digital magnification over optical zoom and/or optical magnification. Prioritizing digital zoom and/or digital magnification over optical zoom and/or optical magnification may provide for a larger depth of field, making autofocus easier than would be otherwise.

In one embodiment, zoom application 402 may allow each area of motion to be associated with a particular time period (e.g., time of day, day of week, etc.), to account for the fact that motion in the area of motion may be time dependent. For example, the area of motion may show much traffic during times during a day, and not during other times.

In some embodiments, zoom application 402 may include a software or hardware component for learning, based on the past user specified zooms and magnifications and camera state. If the current state of camera 110 is similar to a prior state of camera 110 (e.g., time of day, amount of light, etc.), when a new zoom is requested, zoom application 402 may attempt to match current optical and digital magnifications/zoom to prior magnifications/zoom.

Zoom modes 520 show different types of zoom that application 402 may apply when application 402 zooms into a desired field of view. In the implementation shown, the available modes include: (1) optical zoom only (OZ), (2) digital zoom only (DZ), (3) equal amount of simultaneous optical zoom and digital zoom, (4) simultaneously apply weighted optical zoom and digital zoom based on light conditions; and (5) simultaneously apply weighted optical zoom and digital zoom based on depth of field. When in mode (2) or (3), application 402 may set the optical magnification value $Z_o$ or the digital magnification value $Z_d$ to the desired magnification. When in mode (4) or (5), application 402 may request interleaved zoom application 404 to determine an optical magnification value $Z_o$ and a digital magnification value $Z_d$. Other modes are possible (e.g., a combination of different modes).

In one embodiment, both light conditions and DOF are considered by interleaved zoom application 404 (e.g., a combination of mode (4) and (5)). In the embodiment, interleaved zoom application 404 may determine a depth-of-field value and a brightness level of a scene. Further, based on the determined depth-of-field value and scene brightness level, interleaved zoom application 404 may determine and apply appropriate amounts of optical zoom and digital zoom.

As shown in FIG. 5, zoom modes 520 may also include a cap mode 522 that, when activated, causes application 402 to take into account the resolution of sensor array 208 when calculating digital magnification value $Z_d$ and/or optical magnification value $Z_o$. For example, in mode (4) or (5) when cap mode 522 is activated, application 402 may request interleaved zoom application 404 to use a digital zoom as long as the magnification is not constrained by the resolution of the sensor (e.g., the magnification would result in a lower resolution image). If it does, application 402 may request interleaved zoom application 404 to limit digital magnification value $Z_d$. Similarly, in mode (2) or (3) when button 522 is activated, application 402 may limit the value of digital magnification value $Z_d$.

As shown in FIG. 5, management station 130 may include a display 500 that shows user interface 502 as generated by application 402. In a different embodiment, application 402 may include additional, fewer, different, or a different arrangement of components than those illustrated in FIG. 5. For example, application 402 may not display zoom modes 520. In such an implementation, modes 520 may be accessible via a menu hierarchy or set automatically. In another example, application 402 may include a user interface that includes more options, such as options for automatically adjusting for decreased lighting conditions for zooming (e.g., decrease shutter speed). Some of the features provided in FIG. 5 may also be available over a network or to another component through an API.

Returning to FIG. 4, because performing an optical zoom may decrease the amount of light incident on sensor array 208 (e.g., in a camera with a variable aperture lens), if the decreased exposure is at an undesirable level, application 402 may compensate by invoking an exposure control function provided by, for example, camera interface 408 to increase the exposure (e.g., by decreasing the shutter speed).

In addition, when zoom application 402 magnifies a field of view, the rates at which the optical magnification and/or the digital magnification changes may be expressed by different profiles, such as a linear or non-linear function of the total magnification value. In an embodiment, zoom application 402 may display a combined "zooming effect" to simulate a single zoom (even though it may include both digital and optical zoom) so that the zoom appears smooth to the user. In this embodiment, the zoom may appear smooth even if each type of zoom is applied separately, discretely, and/or in an alternating manner.

Zoom application 402 may call interleaved zoom application 404 to calculate digital magnification value $Z_d$ and/or optical magnification value $Z_o$. Interleaved zoom application 404 receives a desired total magnification value $Z_t$ and determines digital magnification value Zd for a digital zoom and/or an optical magnification value Zo for an optical zoom. Any component (e.g., operating system 410, application 402, an external device, etc.) may request digital magnification value $Z_d$ and/or optical magnification value $Z_o$ given a total magnification value $Z_t$. To determine digital magnification value $Z_d$ and optical magnification value $Z_o$, interleaved zoom application 404 may use measurements (e.g., "parameter values") from sensors (e.g., the intensity I of captured images) and/or the state of camera 110 (e.g., depth of field DOF). To obtain these parameter values, interleaved zoom application 404 may use hardware drivers (e.g., drivers for sensors, drivers for measuring relative lens locations, drivers measuring camera positions, etc.).

Interleaved zoom application 404 may define and/or determine the total magnification value $Z_t$ as the product of the optical magnification value $Z_o$ and digital magnification value $Z_d$ expressed by:

$$Z_t = Z_o \bullet Z_d \qquad (1)$$

That is, interleaved zoom application 404 can divide total magnification value $Z_t$ by optical magnification value $Z_o$ to calculate the digital magnification value $Z_d$. Likewise, interleaved zoom application 404 can divide total magnification value $Z_t$ by digital magnification value $Z_d$ to calculate the optical magnification value $Z_o$.

In one embodiment, interleaved zoom application 404 may obtain a lighting condition of an image (e.g., intensity I), aperture size setting (e.g. f-stop), and/or depth of field (DOF) from detectors 406 and/or camera interface 408. Based on intensity I and/or the DOF, interleaved zoom application 404 may determine optical magnification $Z_o$ and/or digital magnification value $Z_d$ to achieve a desired total magnification value $Z_t$.

In this embodiment, interleaved zoom application 404 may determine optical magnification $Z_o$ and digital magnification $Z_d$ based on the light condition of a scene. In one implementation, interleaved zoom application 404 includes a discrete function $Z_d(n)$ over intensity I(n), stored as an array or a table with "n" as an index value of the array or table. Accordingly, interleaved zoom application 404 can look up digital zoom optimal $Z_d(n)$ when the measured intensity I falls between I(n) and I(n+1). That is, interleaved zoom application 404 can determine digital magnification $Z_d$ such that:

$$Z_d = Z_d(n), \text{ when } I(n) < I < I(n+1), \text{ for the identified } n \qquad (2)$$

Optical magnification value $Z_o$ can be determined based on expression (1) given a requested total magnification value $Z_t$ and digital magnification $Z_d$ from the table. In a different implementation, interleaved zoom application 404 may determine digital magnification value $Z_d$ based on logic that expresses a mathematical formula rather than by looking up a value in accordance with expression (2).

In some instances, sensor array 208 may perform poorly in low-light conditions (e.g., low intensity I of captured images) or when the captured images are saturated (e.g., poor ability to capture contrast). To compensate for this lack of sensitivity, interleaved zoom application 404 may, in one embodiment, prioritize optical magnification (and/or optical zoom) over digital magnification (and/or digital zoom) to maximize the performance of sensor array 208. Given low-light conditions, for example, interleaved zoom application 404 may determine the digital magnification value $Z_d$ to be less than $Z_t^{1/2}$ (e.g., the square root of the total magnification value $Z_t$). For example, if the desired total magnification $Z_t$ is 2, then the digital magnification value $Z_d$ can be determined to be less than the square root of 2 ($Z_d < 2^{1/2} \approx 1.414$) for a particular low light intensity.

Conversely, under a good lighting condition, interleaved zoom application 404 may prioritize digital magnification (and/or digital zoom) over optical magnification (and/or optical zoom) for a desired total magnification $Z_t$. For example, interleaved zoom application 404 may determine the digital magnification value $Z_d$ to be greater than $Z_t^{1/2}$ (e.g., greater than the square root of the total magnification value $Z_t$).

In another embodiment, interleaved zoom application 404 may determine the level of optical magnification $Z_o$ and digital magnification $Z_d$ based on camera 110's capacity to autofocus to a particular subject. At a particular magnification level, the autofocus can be affected by DOF of lens assembly 206. In one embodiment, interleaved zoom application 404 includes a discrete function $Z_d(m)$ over domain DOF(m), stored as an array or a table with "m" as the index to the array or table. In this embodiment, interleaved zoom application 404 can look up a digital magnification $Z_d(m)$ when the measured/computed DOF falls between DOF(m) and DOF(m+1). That is, interleaved zoom can determine digital magnification $Z_d$, such that:

$$Z_d = Z_d(m), \text{ when } DOF(m) < DOF < DOF(m+1), \text{ for the identified } m \qquad (3)$$

The optical magnification $Z_o$ can be determined based on expression (1) given a desired total magnification $Z_t$ and digital magnification $Z_d$ from the table. In a different implementation, interleaved zoom application 404 may determine the digital magnification $Z_d$ based on logic that expresses a mathematical formula rather than looking up a value in accordance with expression (3).

In one embodiment, autofocus may be less effective for a small or shallow DOF. In such a situation, interleaved zoom application 404 may prioritize digital zooming and/or magnification over optical zooming and/or magnification. By prioritizing digital zoom and/or digital magnification over optical zoom and/or optical magnification, the DOF can be maintained (e.g., not made shallower) so as not to further degrade autofocus ability. For example, for a small DOF, interleaved zoom application 404 may determine and/or select the digital magnification value $Z_d$ to be greater than $Z_t^{1/2}$ (e.g., greater than the square root of the total magnification value $Z_t$). Conversely, for a large DOF, interleaved zoom application 404 may prioritize optical zoom and/or optical magnification over digital zoom and/or digital magnification.

In another embodiment, after interleaved zoom application 404 determines the digital magnification $Z_d$ and the optical magnification $Z_o$, interleaved zoom application 404 may readjust the magnification values $Z_d$ and $Z_o$ based on the quality of digitally magnified image. For example, assume that sensor array 208 can capture more pixels for an image than a display area (e.g., viewport or a display screen) that shows the image (or more than a requested resolution for a video stream from camera 110 by management station 130). In this situation, interleaved zoom application 404 can prioritize digital zoom and/or digital magnification over optical zoom and/or magnification. For example, interleaved zoom application 404 can perform a digital zoom (e.g., exclusively) for a given area until the number of pixels of the digitally magnified area matches the resolution of the display area.

Assume that a resolution of sensor array 208 is M pixels wide and that the resolution of the display is N pixels wide. If camera 110 applies a digital magnification $Z_d$ to the image on sensor array 208, the number of pixels on sensor array 208 contributing to the zoomed is image becomes $M/Z_d$, while the number of pixels of the display area (e.g., assigned to the current field of view) remains the same. That is, the magnification causes the effective number of pixels of sensor array 208 to be decreased to $M/Z_d$. This decreased number of pixels, however, may not manifest on the displayed area as long as the number of pixels of the display area is less than the effective number pixels of sensor array 208 being used for the image ($Z_d<M/N$).

Accordingly, in this embodiment interleaved zoom application 404 can increase the digital zoom until $M/Z_d$ reaches N. If interleaved zoom application 404 were to increase the digital magnification $Z_d$ further, the resolution of zoomed image would be less than that of the displayed area. Put another way, the digital magnification $Z_d$ in this embodiment does not exceed M/N, otherwise there would be loss in the displayed image resolution.

In one embodiment, interleaved zoom application 404 enables a cap or maximum to be associated with the digital zoom (e.g., a maximum of M/N). Thus, after computing optical magnification value $Z_o$ and digital magnification value $Z_d$ as discussed above, interleaved zoom application 404 can reset or determine the digital magnification value $Z_d$ so that:

$$Z_d = \min(Z_d, M/N). \quad (4)$$

The optical magnification value $Z_o$ can be recalculated based on the result of (4) and expression (1).

In the above, although functions specified by expressions (2) and (3) are given in terms of $Z_d$, it is also possible for interleaved zoom application 404 to include functions defined in terms of $Z_o$. In these embodiments, interleaved zoom application 404 may determine $Z_o$ prior to determining $Z_d$.

In some embodiments, interleaved zoom application 404 may prioritize a digital zoom and/or magnification over an optical zoom and/or magnification when autofocus is difficult. For example, autofocus may be difficult when a field of view includes bright light sources (e.g., headlights of automobiles), when sensor array 208 is saturated, etc. In another example, autofocus may be difficult when a desired field of view is within an area of motion.

Referring to FIG. 4, detectors 406 detect parameters that are associated with of an image, such as illumination (or exposure), a focal distance, an effective aperture size, orientation of camera 110, etc. When detectors 406 receive a request for one of the parameter values, detectors 406 may obtain the value from hardware, software, existing images, etc. and provide the value to the requesting component. For example, interleaved zoom application 404 may request detectors 406 for a value of an average light intensity of an image. In response, detectors 406 may then calculate the brightness of the image (e.g., based on its pixel values) and provide the resulting value to interleaved zoom application 404.

In another example, interleaved zoom application 404 may request detectors 406 to provide the focal distance of lens assembly 206, DOF, and/or a camera aperture size. Detectors 406 may obtain relative lens locations from lens assembly 206 (e.g., via camera interface 408), and based on the locations and lens parameters, determine the focal distance, the DOF, and the aperture size. Interleaved zoom application 404 may use the values returned from detectors 406.

Camera interface 408 may include device drivers for hardware components of camera 110. Other components, such as detectors 406 and interleaved zoom application 404 may invoke camera interface 408 to obtain measurements (e.g., lens locations, camera 110 orientation, brightness values, etc.), as well as to control various components of camera 110. For example, interleaved zoom application 404 and/or zoom application 402 may use camera interface 408 to set a direction of camera 110 by driving actuators 212 (based on measured/calculated camera direction), change camera aperture size by opening shutter 204, apply an optical magnification, apply a digital magnification, etc.

Camera 110 may include additional, fewer, different, or a differently arranged components than those illustrated in FIG. 4. For example, camera 110 may include software applications for recording, encoding, editing, and/or transcoding video, as well as audio programs, additional communication programs (e.g., email program), etc. In addition, functions described as being performed by one of the components of camera 110 may be performed by another component.

Figure 6:
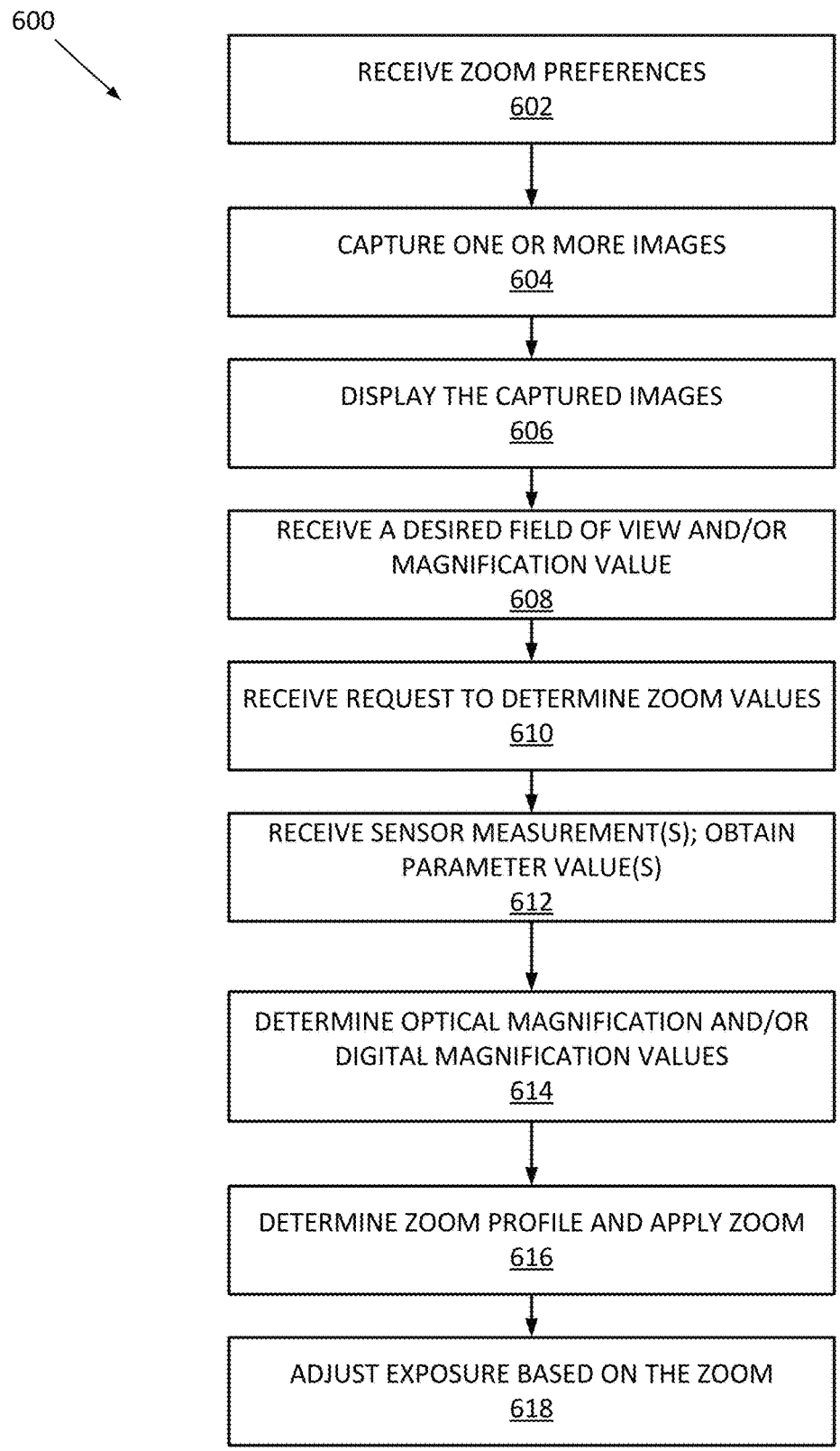
FIG. 6 is a flow diagram of an exemplary process for applying a digital and optical zoom based on different image capturing conditions.

FIG. 6 is a flow diagram of an exemplary process 600 that is associated with applying a digital and optical zoom. In one embodiment, camera 110 may perform process 600. In other embodiments, management station 130 may perform certain blocks of process 600.

Process 600 may include receiving zoom preferences (block 602). For example, application 402 may launch and allow another component, device, or a user to select different types of zooms. For example, application 402 may present the user (over a network via a browser) with a zoom option that would cause application 402 to apply simultaneously both optical zoom and digital zoom. Upon receipt of the selected preference, camera 110 may save the received preferences either locally or at another location (e.g., cloud, a network storage device, management station 130, etc.).

Process 600 may also include receiving and/or capturing one or more images (block 604) and/or displaying the captured images (block 606). For example, camera 110 may receive a sequence of video frames from sensor array 208. In one embodiment, application 402 may display the captured images on a display. In one embodiment, management station 130 may receive a video stream from camera 110 for displaying on a display.

Process 600 may further include receiving a desired field of view and/or total magnification value $Z_T$ (block 608). In one embodiment, camera 110 may receive desired field of view 506 within display window 504 and calculate the total magnification value $Z_T$. Alternatively, a user may indicate the desired field of view via a scroll button, a mouse wheel, a joystick, etc., to incrementally specify a desired zoom level. In an embodiment where application 402 receives an API call, the interface may provide an option to specify a zoom level (e.g., 110%) and/or well as the location of the desired field of view. Application 402 may receive an API call, for example, when a desired field of view or magnification value is based on a rule (such as following an object, time of day, etc.). In another embodiment, the total magnification value $Z_t$ may be received (block 608) without any change to the field of view. For example, if lighting conditions change, then interleaved zoom application 404 may change the optical magnification value $Z_o$ may change, and the digital magnification value $Z_d$ may change, even if the total magnification value $Z_t$ does not change.

Process 600 may include receiving a request to determine zoom values (block 610), such as part of a request to zoom a desired field of view. For example, the user may activate magnify button 508 provided via user interface 500. Alternatively, when a user clicks on a scroll arrow of a viewing window or spin a mouse wheel, camera 110 may determine that the user has requested a specific zoom level. As another example, camera 110 may zoom to the desired field of view in response to a rule (e.g., motion). As yet another example, interleaved zoom application 404 may determine that lighting conditions have changed and new zoom values should be determined (e.g., to increase or decrease the depth of field). For example, if interleaved zoom application 404 determines that lighting conditions have improved, interleaved zoom application 404 may increase the digital magnification value $Z_d$ and decrease optical magnification value $Z_o$ (e.g., while keeping the total magnification value $Z_t$ the same). Or, if interleaved zoom application 404 determines that lighting conditions have worsened, interleaved zoom application 404 may decrease digital zoom and increase optical zoom (e.g., while keeping the total magnification value Zt the same).

Process 600 may further include making sensor measurements and obtaining parameter values related to the captured images/desired zoom based on the measurements (block 612). For example, camera 110 may obtain the pixel values of a captured image; and obtain focal distance of the lens assembly (e.g., via camera interface 408). Based on the measurements and the captured image(s), camera 110 may determine, for example, parameters such as the brightness of the image, a focal distance, a camera aperture size, and the DOF.

Process 600 may include determining an optical magnification value and/or a digital magnification value (block 614). If a mix of optical zoom and digital zoom has been specified (e.g., options for weighting the optical zoom and digital zoom based on based on either focus or light conditions of the captured images), camera 110 may determine optical magnification value $Z_o$ and/or digital magnification value $Z_d$ in the manner described above for interleaved zoom application 404. The magnification values $Z_o$ and $Z_d$ may be based on the sensor measurements determined in block 612. The computation may depend on whether the user has opted to limit the digital zoom to avoid possible image degradation should the zoom exceed the ratio of a sensor array resolution to the display resolution.

If the user has specified using only a digital zoom or only an optical zoom, camera 110 may determine the digital magnification value $Z_d$ and/or the optical magnification value $Z_o$ based on the ratio of the dimension of the display area (or based on the resolution of the video stream from camera 110 to management device 130) to the dimension of the selected zoom area or field of view.

Process 600 may include determining an optical zoom profile and digital zoom profile and applying the zoom (block 616). The profiles may define how each zoom value changes over the total zoom value and the order in which each type of zoom is applied. As such, the current magnification levels of camera 110 and the magnification levels $Z_d$ and $Z_o$ form part of the zoom profiles (e.g., the start points and the end points). For example, depending upon the parameters received from block 614 and the level of total zoom ($Z_T$) requested in block 614, each type of zoom may be incrementally applied in an interleaved manner. In one embodiment, each type of zoom is applied to produce a smooth combined zoom. In another embodiment, optical zoom or digital zoom may be applied in their entirety and in a sequential manner. For example, camera 110 may zoom optically until the full value of optical magnification is reached, then zoom digitally until a full value of digital zoom is reached to arrive at the total zoom. Once the profiles are selected, values for each type of zoom may be generated as a function of the total zoom. As indicated at block 602, a user may have specified different types of zoom to apply.

Camera 110 may apply only a digital zoom, only an optical zoom, or a mix of the optical and digital zoom based on the determined magnification values $Z_o$ and $Z_d$. For instance, based on magnification values $Z_o$ and $Z_d$, application 402 may use camera interface 408 to drive the optical zoom and the digital zoom. Applying the optical zoom may include changing the orientation of camera 110 via actuators 212 as well as setting the optical zoom of lens assembly 206. In one embodiment, camera may apply a digital zoom and/or an optical zoom based on the user preferences.

To apply the digital zoom, camera 110 may obtain an image captured at sensor array 110 after applying the optical zoom and crop the image to the desired digital zoom magnification.

Process 600 may include adjusting the exposure for the captured images (block 618). For example, applying the zoom may have hanged the desired level of image illumination. To compensate, camera 110 may adjust the shutter 204, based on brightness of the captured images, the magnification of the optical zoom, or the focal distance.

This specification has disclosed various embodiments of a device for applying simultaneously a digital and an optical zoom. By providing both types of zoom at the same time, the device avoids having to transition from one type of zoom to another type of zoom. Depending on image capturing conditions, camera 110 prioritizes a digital or optical zoom and/or magnification.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—t being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   capturing an image at a sensor array of a camera, wherein the image is a frame of a sequence of frames of a video;
   determining a field of view associated with a displayed window;
   obtaining a parameter value associated with the captured image;
   obtaining a digital zoom profile, indicative of a rate of change of digital magnification, and an optical zoom profile, indicative of a rate of change of optical magnification, based on the parameter value and the field of view; and
   jointly applying the digital zoom profile and the optical zoom profile to obtain a total magnification, such that the determined field of view expands or contracts relative to the displayed window, by incrementally applying the optical magnification and the digital magnification in an interleaved manner during display of the sequence of frames of the video.

2. The method of claim 1,
   wherein the parameter value includes a light intensity measurement value; and
   wherein the optical magnification is prioritized over the digital magnification based on the light intensity measurement value.

3. The method of claim 1,
   wherein the parameter value includes a depth of field value; and
   wherein the digital magnification is prioritized over the optical magnification based on the depth of field value.

4. The method of claim 1,
   wherein the parameter value includes a sensor resolution and a resolution for display, and
   wherein the digital zoom profile is based on the sensor resolution and the resolution for display.

5. The method of claim 1,
   wherein the parameter value indicates that the field of view includes an area defined as including motion, and
   wherein the digital magnification is prioritized over the optical magnification when the field of view includes the area defined as including motion.

6. The method of claim 5, wherein the area defined as including motion is associated with a time period.

7. The method of claim 1, further comprising:
   adjusting an exposure of light associated with the field of view.

8. The method of claim 7,
   wherein adjusting an exposure of light associated with the field of view includes changing a shutter speed or an aperture.

9. The method of claim 1, wherein jointly applying the digital zoom profile and the optical zoom profile comprises:
   jointly applying the digital zoom profile and the optical zoom profile to the image captured at the sensor array that avoids abrupt transitions between optical zoom and digital zoom during display of the sequence of frames of the video.

10. The method of claim 9, wherein jointly applying the digital zoom profile and the optical zoom profile comprises:
    changing an orientation of the camera;
    jointly applying the digital zoom profile and the optical zoom profile, such that the determined field of view expands to fill the displayed window, by incrementally applying the optical magnification and the digital magnification in an interleaved manner during display of the sequence of frames of the video.

11. A device comprising:
    a lens assembly to focus an image or to optically zoom;
    a sensor array to capture an image output from the lens assembly, wherein the image is a frame of a sequence of frames of a video;
    a memory to store instructions; and
    a processor to execute the instructions to:
      cause the sensor array to capture an image;
      determine a field of view associated with a displayed window;
      obtain a parameter value associated with the captured image;
      obtain a digital zoom profile, indicative of a rate of change of digital magnification, and an optical zoom profile, indicative of a rate of change of optical magnification, based on the parameter value and the field of view; and
      jointly apply the digital zoom profile and the optical zoom profile to obtain a total magnification, such that the determined field of view expands or contracts relative to the displayed window, by incrementally applying the optical magnification and the digital magnification in an interleaved manner during display of the sequence of frames of the video.

12. The device of claim 11,
    wherein the parameter value includes a light intensity measurement value; and
    wherein the processor is to execute the instructions to prioritize the optical magnification over the digital magnification based on the light intensity measurement value.

13. The device of claim 11,
    wherein the parameter value includes a depth of field measurement value; and
    wherein the processor is to execute the instructions to prioritize the digital magnification over the optical magnification based on the depth of field measurement value.

14. The device of claim 11,
    wherein the parameter value includes a sensor resolution and a resolution for display, and
    wherein the digital zoom profile is based on the sensor resolution and the resolution for display.

15. The device of claim 11,
    wherein the parameter value indicates that the field of view includes an area defined as including motion, and
    wherein the processor is to execute the instructions to prioritize digital magnification over the optical magnification when the field of view includes the area defined as including motion.

16. The device of claim 15, wherein the area defined as including motion is associated with a time period.

17. The device of claim 16, wherein the processor is to further execute the instructions to: adjust an exposure of light associated with the field of view.

18. The device of claim 17, wherein when the processor adjusts an exposure of light associated with the field of view, the processor is to further execute the instructions to: change a shutter speed or an aperture.

19. The device of claim 11, wherein when the processor jointly applies the digital zoom profile and the optical zoo profile, the processor is configured to further execute the instructions to:
jointly apply the digital zoom profile and the optical zoom profile to the image captured at the sensor array that avoids abrupt transitions between optical zoom and digital zoom during display of the sequence of frames of the video.

20. The device of claim 19, wherein when the processor jointly applies the digital zoom profile and the optical zoom profile, the processor is to further execute the instructions to:
change an orientation of the lens assembly; and
jointly apply the digital zoom profile and the optical zoom profile, such that the determined field of view expands to fill the displayed window, by incrementally applying the optical magnification and the digital magnification in an interleaved manner during display of the sequence of frames of the video.

\* \* \* \* \*